US011520805B2

(12) United States Patent
Kamran et al.

(10) Patent No.: US 11,520,805 B2
(45) Date of Patent: Dec. 6, 2022

(54) METHOD AND SYSTEM FOR REPLICATION

(71) Applicant: EMC IP Holding Company LLC, Hopkinton, MA (US)

(72) Inventors: Lior Kamran, Rishon LeZion (IL); Amitai Alkalay, Kadima (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 18 days.

(21) Appl. No.: 17/158,536

(22) Filed: Jan. 26, 2021

(65) Prior Publication Data
US 2022/0237205 A1    Jul. 28, 2022

(51) Int. Cl.
*G06F 16/27* (2019.01)
*G06F 21/60* (2013.01)
*G06F 16/215* (2019.01)
*H04L 9/06* (2006.01)

(52) U.S. Cl.
CPC ............ *G06F 16/27* (2019.01); *G06F 16/215* (2019.01); *G06F 21/602* (2013.01); *H04L 9/0643* (2013.01)

(58) Field of Classification Search
CPC ...... G06F 16/27; G06F 16/215; G06F 21/602; H04L 9/0643
See application file for complete search history.

(56) References Cited

U.S. PATENT DOCUMENTS

| 2015/0363282 | A1* | 12/2015 | Rangasamy | ............ | G06F 11/00 714/4.12 |
| 2016/0165012 | A1* | 6/2016 | Li | ........................ | H03M 7/3064 709/247 |
| 2021/0255791 | A1* | 8/2021 | Shimada | ................ | G06F 3/0659 |

* cited by examiner

*Primary Examiner* — Albert M Phillips, III
(74) *Attorney, Agent, or Firm* — Krishnendu Gupta; Deepika Bhayana; Lesley A. Leonessa

(57) ABSTRACT

Techniques are used for replication in a storage system. The techniques may be used to provide, among other things, the determination that a data block has more than one instance in a storage system. A similarity hash for the data block is determined, and an instruction is transmitted from a source system to a target system to replicate the data block based on the similarity hash.

12 Claims, 6 Drawing Sheets

METHOD AND SYSTEM FOR REPLICATION

BACKGROUND

Technical Field

This application relates to reducing bandwidth consumption for replication.

Description of Related Art

A distributed storage system may include a plurality of storage devices to provide data storage to a plurality of hosts. The plurality of storage devices and the plurality of hosts may be situated in the same physical location, or in one or more physically remote locations. The storage devices and the hosts may be connected to one another over one or more computer networks.

Data replication can generally comprise copying, or replicating, data from one set of storage devices to another set of storage devices for the purpose of backup. For example, data can be replicated from storage devices within a first computing cluster (which can be a set of computing devices that work together and can be logically considered to be a single computing system) to storage devices within a second computing cluster. Then, if the first computing cluster fails, the second computing cluster can possess an updated state of the first computing cluster and can take over services provided by the first computing cluster, such as data storage and access.

Data deduplication (also referred to simply as "deduplication") is a space-saving technology intended to eliminate redundant (duplicate) data (such as, files) on a data storage system. By saving only one instance of a file, disk space can be significantly reduced. For example, suppose a file of size 10 megabytes (MB) is stored in ten folders of each employee in an organization that has ten employees. As a result, 100 megabytes (MB) of the disk space is consumed to maintain the same file of size 10 megabytes (MB). Deduplication ensures that only one complete copy is saved to a disk. Subsequent copies of the file are only saved as references that point to the saved copy, such that end-users still see their own files in their respective folders. Similarly, a storage system may retain 200 e-mails, each with an attachment of size 1 megabyte (MB). With deduplication, the disk space needed to store each attachment of size 1 megabyte (MB) is reduced to just 1 megabyte (MB) from 200 megabyte (MB) because deduplication only stores one copy of the attachment.

It is noted that the terms "storage device(s)", "drive(s)", and "disk(s)" are employed herein interchangeably, even though it is well known that not all physical storage devices or drives include rotating disks.

SUMMARY OF THE INVENTION

One aspect of the current technique is a method for reducing bandwidth consumption for replication. The method includes determining, by a source system, that a data block has more than one instance in a storage system. A similarity hash for the data block is determined, and an instruction is transmitted to a target system to replicate the data block based on the similarity hash.

In some embodiments, determining that a reference count of the data block exceeds one determines that the data block has more than one instance in the storage system. The reference count may be accessed from the metadata of the data block. Furthermore, the method may include determining a cryptographic hash of the data block, and the instruction to replicate the data block may include both the similarity hash and the cryptographic hash of the data block. The method may determine the data block has been previously transmitted to the target system.

Another of the current technique is a method for reducing bandwidth consumption for replication. The method includes receiving, by a target system, an instruction to replicate a data block based on a similarity hash. A deduplication table is searched for the similarity hash. A data block from the deduplication table is verified as a match to the data block corresponding to the received similarity hash. The data block from the deduplication table is replicated.

The instruction to replicate the data block may include both the similarity hash and a cryptographic hash of the data block. The cryptographic hash of the data block from the deduplication table may be computed and compared against the received cryptographic hash from the instruction.

Another aspect of the current technique is a system with at least one processor. The at least one processor is configured to determine, by a source system, that a data block has more than one instance in a storage system; determine a similarity hash for the data block; transmit an instruction to a target system to replicate the data block based on the similarity hash; search a deduplication table on the target system for the similarity hash; verify a data block from the deduplication table matches the data block corresponding to the received similarity hash; and replicate the data block from the deduplication table. The at least one processor may be configured to perform any other processes in conformance with the aspect of the current techniques described above.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Figure 1:
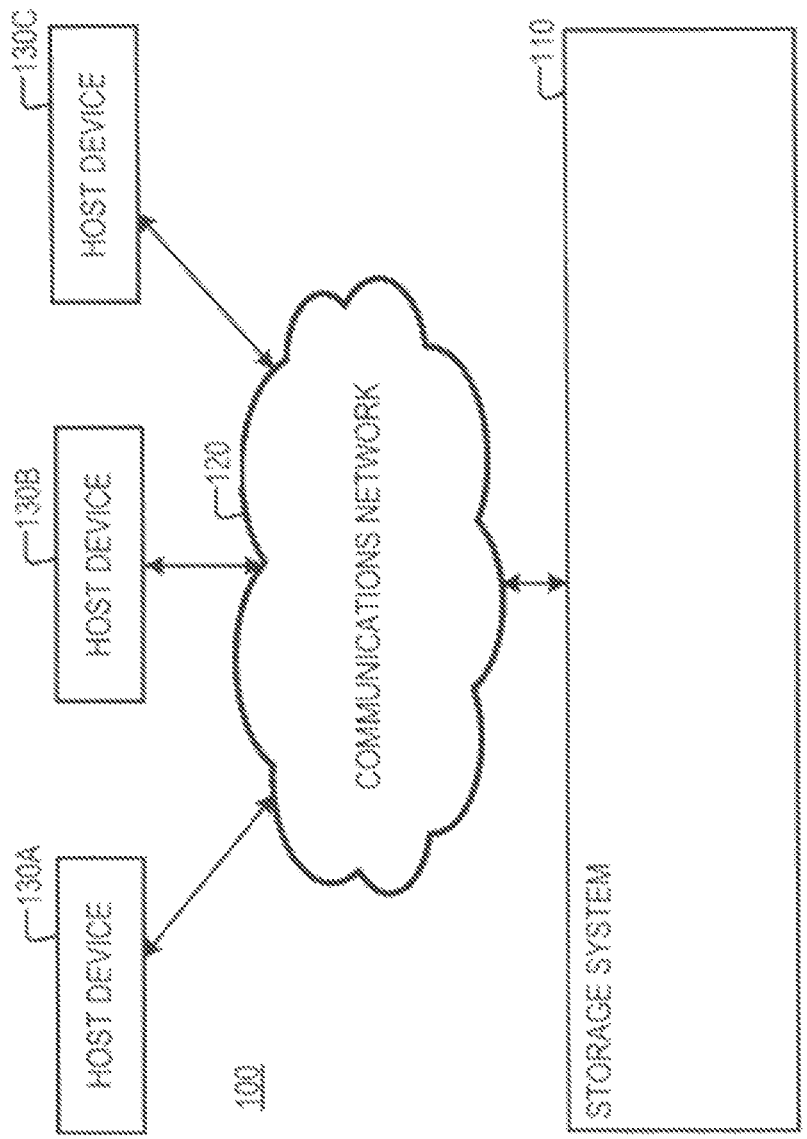
FIG. 1 is a diagram of an example of a computing system, including a storage system, according to aspects of the disclosure.

Described below is a technique for achieving replication in a storage system, which technique may be used to provide, among other things, determining, by a source system, that a data block has more than one instance in a storage system; determining a similarity hash for the data block; and transmitting an instruction to a target system to replicate the data block based on the similarity hash.

During a replication cycle, a source system determines the difference between the two most recently captured snapshots of a volume. These differences are sent to the target system and stored as a shadow snapshot. In some situations, the source and target systems may be physically separated by a considerable distance (e.g., thousands of miles), and the computer network connecting the systems may be a limited wide area network (WAN), whose bandwidth may be limited, unreliable, or both. Thus, availability of network bandwidth may hamper replication between the source and target systems, thereby undermining the reliability of the storage system.

Data deduplication is a process by which a data storage system can detect multiple identical copies of data and keep a single copy of that data, thus eliminating the redundant data by removing other copies of that data and thus improving storage utilization. In at least some systems, data deduplication requires iterating over data in one or more storage extents. Conventional approaches to deduplication rely on rigorous cryptographic hash signatures (also referred to herein as "strong hash signatures"), which are obtained by applying a cryptographic hash function to data to product its digest. Because identical copies of data result in the same digest, conventional deduplication techniques store digests in an index table and compare the strong hash signatures of data to be deduplicated to these digests. If the techniques find a match, an exact copy of data is assured and the data is deduplicated. In this manner, identical portions of data are mapped to a single copy of the data. While the cryptographic hash functions are robust, the functions are also computationally intense, consuming significant processing cycles by processors.

Various embodiments of the current solution use metadata of the data blocks, a hash function that are less computationally intense than strong hash functions (i.e., a similarity hash function), and a strong hash signature to determine whether a potentially deduplicated data block has already been transferred to a target system. The source system accesses, in metadata, the reference count of a data block. If the reference count indicates the data block has been deduplicated, the source system calculates the similarity hash signature and strong hash signature and sends these signatures to the target system in lieu of the data block itself. The target system uses the hash signatures to determine whether the data block has previously been received, and requests the data block from the source system if it has not. Because the source system avoids transferring data that has not previously been sent to the target system, the techniques described herein substantially reduce the bandwidth required by replication.

In at least some implementations in accordance with the techniques as described herein, one or more of the following advantages can be provided: reductions in bandwidth required by replication, increased reliability of the source and target systems in a storage system, and lower costs in deploying target systems.

FIG. 1 is a diagram of an example of a system 100, according to aspects of the disclosure. The system 100 may include a storage system 110 that is coupled to one or more host devices 130 via a communications network 120. The storage system 110 may be configured to retrieve and store data on one or more storage devices in response to I/O requests that are transmitted by the host devices 130. The communications network 120 may include a local area network (LAN), a wide area network (WAN), the Internet, and/or any or suitable type of communications network. Each of the host devices 130 may include a desktop computer, a laptop computer, a server, and/or any other suitable type of electronic device. Additionally or alternatively, each of the host devices 130 may include a file server, which is configured to provide an interface between the storage system 110 and client devices (or applications) that read and write data to the storage system 110.

Figure 2:
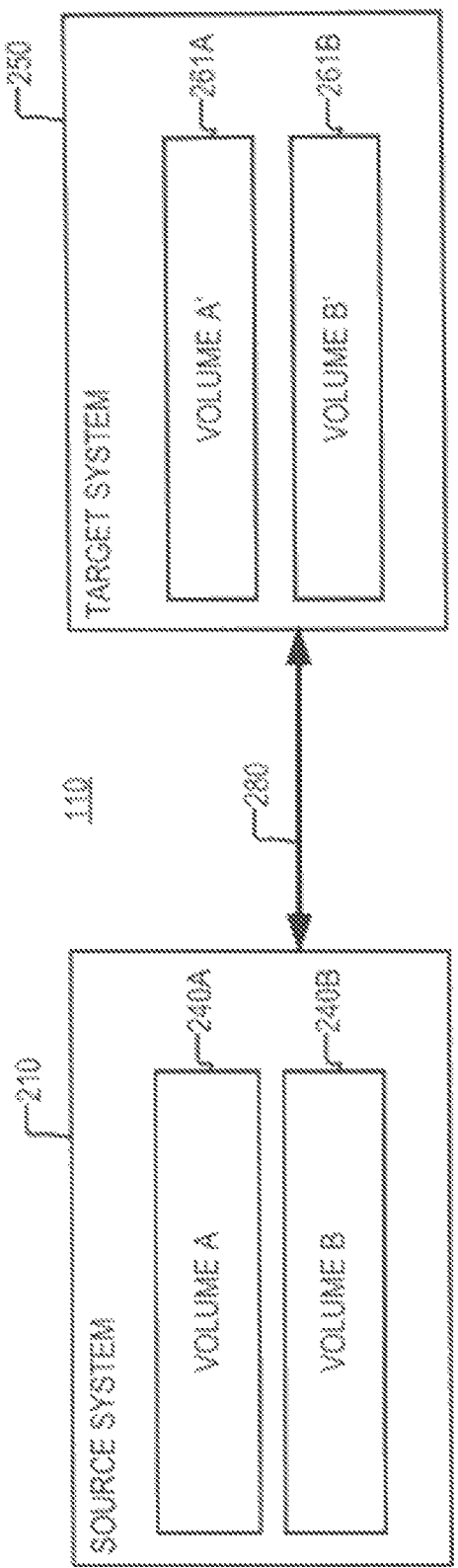
FIG. 2 is a diagram illustrating an exemplary operation of the storage system of FIG. 1, according to aspects of the disclosure.

FIG. 2 is a diagram illustrating an exemplary operation of the storage system 110 of FIG. 1. As illustrated, the storage system 110 may include a source system 210 that is coupled to a target system 250 via a network 280. The network 280 may include a TCP/IP network, an InfiniBand network, and/or any other suitable type of communications network.

The source system 210 may store a volume 240A and a volume 240B. The target system 250 may store a volume 261A and a volume 261B. Volume 261A may be a replica of the volume 240A and volume 261B may be a replica of the volume 240B. According to the present example, volumes 261A and 261B are maintained via asynchronous replication. It will be understood that the present disclosure is not limited to any specific method for performing asynchronous replication.

Furthermore, although FIG. 2 depicts two volumes 240A, 240B, one of ordinary skill in the art would appreciate that the source system 210 may store any number of volumes, and the target system 250 may store the corresponding number of replicas. Additionally, while the storage system 110 of FIG. 2 depicts a single target system 250, various embodiments may deploy multiple target systems 250.

In illustrative embodiments, the storage system 110 may employ a snapshot (or replication) mechanism to replicate data between the source system 210 and the target system 250. A replica (or snapshot) may be created from data within the source system 210 and transferred to one or more target system 250 during a data replication cycle by data replication. Data replication may be performed based on data replication policies that may define various settings for data recovery operations. For example, a policy may define a plurality of attributes, such as a frequency with which replicas are generated and how long each replica is kept at the target system 250. A policy may also define a remote replica lag (e.g., the length of time during which updates may be lost in case of a source system 210 failure), a recovery point objective (RPO) (e.g., a maximum acceptable lag time between the time data is committed to the source system 210 and the time the data is committed to the target system 250 or an acceptable amount of data loss measured in time), a recovery time objective (RTO) (e.g., the time taken to perform the recovery), the mode of replication (e.g., synchronous, asynchronous, continuous data protection (CDP), point in time (PIT), and so forth), and/or other attributes.

Figure 3:
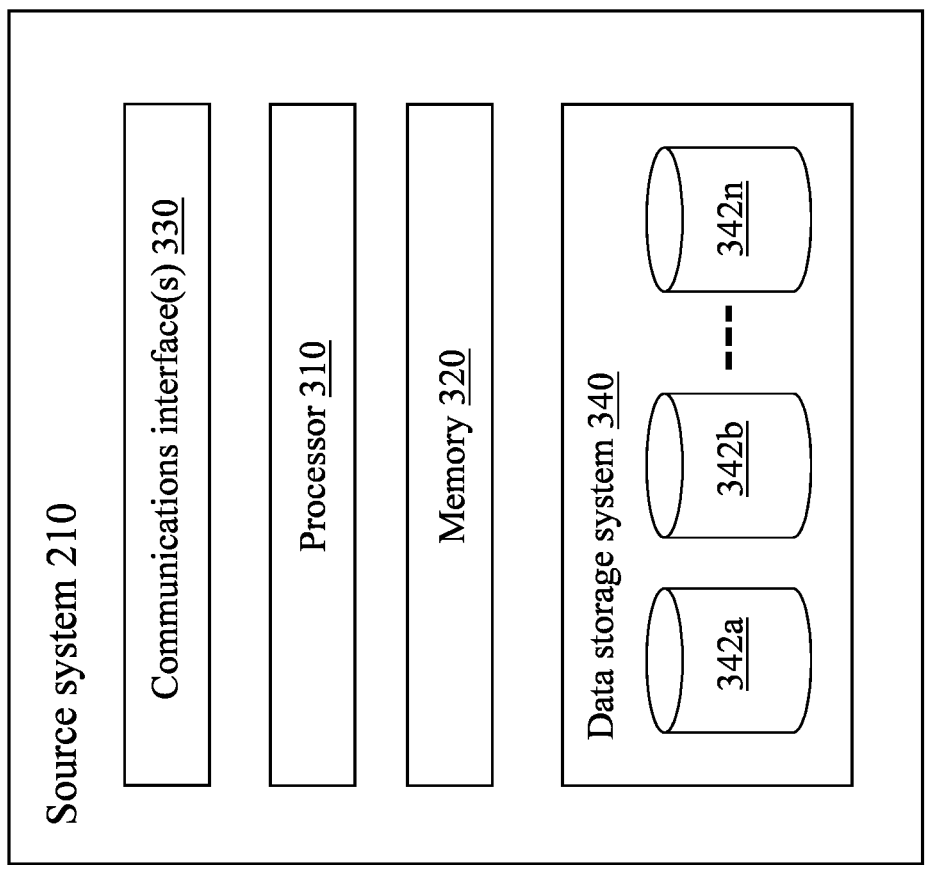
FIG. 3 is a block diagram illustrating an exemplary embodiment of the source system in the storage system of FIG. 2, according to aspects of the disclosure.

FIG. 3 is a block diagram illustrating an exemplary embodiment of the source system 210 of FIG. 2, though similar teachings may be applied to the target system 250 as well. The source system 210 may include a processor 310, a memory 320, a communications interface(s) 330, and a data storage system 340. The processor 310 may include any of one or more general-purpose processors (e.g., x86 processors, RISC processors, ARM-based processors, etc.), one or more Field Programmable Gate Arrays (FPGAs), one or more application-specific circuits (ASICs), and/or any other suitable type of processing circuitry. The memory 320 may include any suitable type of volatile and/or non-volatile memory. In some implementations, the memory 320 may include one or more of a random-access memory (RAM), a dynamic random memory (DRAM), a flash memory, or any other suitable type of memory device. The communications interface(s) 330 may include any suitable type of communications interface, such as one or more Ethernet adapters, one or more Wi-Fi adapters (e.g., 802.1414 adapters), and one or more Long-Term Evolution (LTE) adapters, for example.

The data storage system 340 may include one or more data storage devices 342a-342n. Unless noted otherwise, data storage devices 342a-342n may be used interchangeably herein to refer to hard disk drive, solid state drives, and/or other known storage devices. One or more data storage devices 342a-342n may be manufactured by one or more different vendors. Each of the storage devices 342a-342n included in the data storage system 340 may be inter-connected (not shown). Additionally, the data storage system 340 may also be connected to the hosts 130A-130n through any one or more communication connections that may vary with each particular embodiment.

It should be noted that the particular data storage system 340 and examples as described herein for purposes of illustration should not be construed as a limitation. Other types of commercially available data storage systems 340, as well as processors and hardware controlling access to these particular devices, may also be included in an embodiment.

In some embodiments, the data storage system 340 provides block-based storage by storing the data in blocks of logical storage units (LUNs) or volumes and addressing the blocks using logical block addresses (LBAs). In other arrangements, the data storage system 340 provides file-based storage by storing data as files of a file system and locating file data using Mode structures. In yet other arrangements, the data storage system 340 stores LUNs and file systems, stores file systems within LUNs, and so on.

Figure 4:
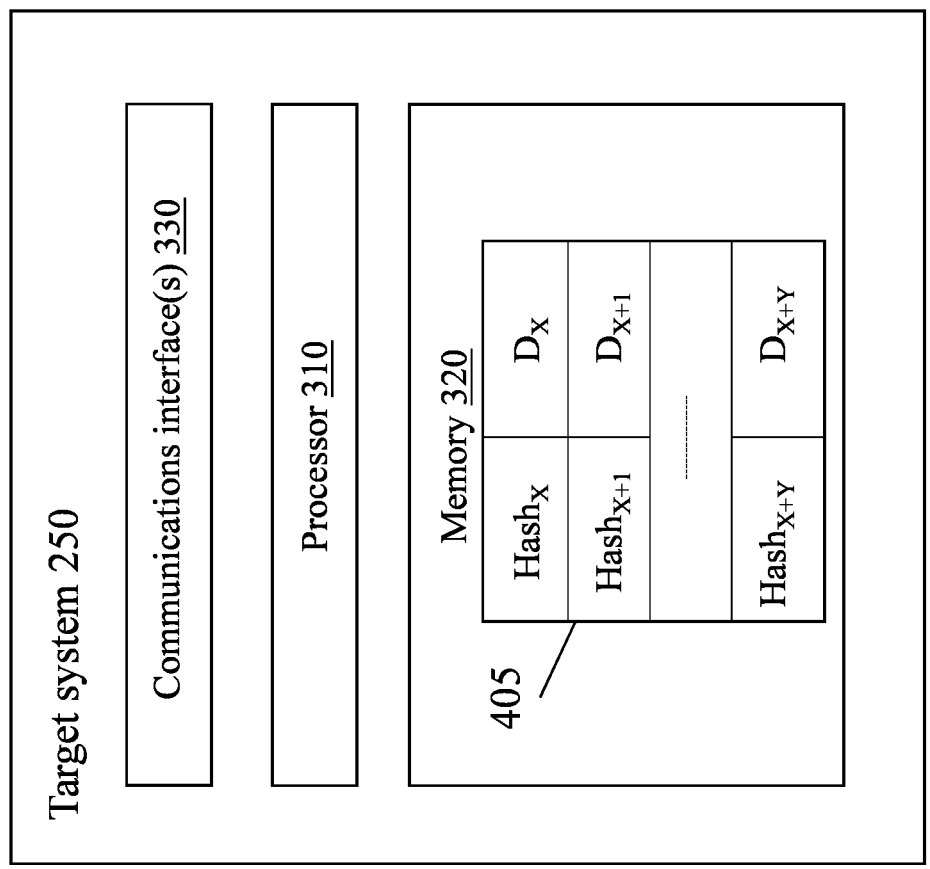
FIG. 4 is a block diagram illustrating an exemplary embodiment of the target system in the storage system of FIG. 2, according to aspects of the disclosure.

FIG. 4 is a block diagram illustrating an exemplary embodiment of the target system 250 of FIG. 2. The target system 250 includes all of the components of the source system 210. The target system 250 also includes a deduplication table 405. In some embodiments, the deduplication table 405 is stored in memory 320. The deduplication table 405 may be stored in cache. The entries of the deduplication table 405 correspond to the data blocks the target system 250 has received. Each entry includes the similarity hash signature of the data block, as well as the data itself. In some embodiments, an entry includes a pointer to the data block, instead of a copy of the data block.

To deduplicate data, the source system 210 iterates over data in one or more storage extents of the data storage devices 342a-342n, or evaluates data as it is ingested (e.g., inline). When the source system 210 deduplicates a data block, the reference count for the data block in metadata is incremented. For example, in some embodiments, the storage system 210 creates an index table of strong hash signatures, each corresponding to a previously received data block. To determine whether a data block should be deduplicated, the storage system 210 calculates its strong hash signature and compares the result against the entries in the index table. If no match can be found, the strong hash signature is added to the index table and the reference count for the data block is incremented. If a match is found, the data block is deduplicated, and the reference count is likewise incremented. In this manner, a reference count greater than one (1) indicates that multiple instances of the data block exist such that the data block has likely been deduplicated. Other approaches and combinations of deduplication techniques may be used, so long as the reference count for data blocks are incremented when copies of the data are found.

When replication begins, the source system 210 accesses the reference count of a data block. If the reference count is one (1), the data block recognized as unique and transferred to the target system 250. If the reference count is greater than one (1), the data block is not unique. However, the reference count does not indicate whether the source system 210 is processing the first instance of the data block, or a subsequent instance. Thus, this information alone does not determine whether the data block has already been transferred to the target system 250.

The source system 210 computes a similarity hash signature for the data block. The similarity hash signature may be based on a non-cryptographic hash function, such as xxhash, murmur3, MD5, crc, or other hash functions, as would be appreciated by one of ordinary skill in the art. Such non-cryptographic hash functions may be computationally simpler than cryptographic hash functions, potentially executing up to twenty (20) times faster. In some embodiments, non-cryptographic hash functions may output about 8 B of data for a data block of 4 KB. The source system 210 may also compute a strong hash signature using, for example, SHA-1 or SHA-2. In some embodiments, cryptographic hash functions may generate a strong hash signature of 20 B for a data block of 4 KB. The source system 210 may transmit the similarity and strong hash signatures to the target source 250, in lieu of the data block itself. In some embodiments, the source system 210 may bundle the similarity and strong hash signatures of multiple data blocks for replication to be transmitted together.

Upon receiving the signatures, the target system 250 searches the deduplication table 405 for the similarity hash signature. If no match is found, the target system 250 has not previously received the data block and requests the data block from the source system 210.

If a match is found, the target system 250 verifies that the data block in the deduplication table 405 is a copy of the data block corresponding to the hash signatures transmitted by the source system 210. Because similarity hash functions are not as rigorous as cryptographic hash functions, their outputs have a higher rate of collision. Consequently, matching similarity hash signatures suggest, but do not guarantee, that the underlying data blocks are the same. To verify that the data blocks are exact copies, the target system 250 computes the strong hash signature of the data block in the deduplication table 405 and compares it to the strong hash signature received from the source system 210.

If the signatures do not match, the target system 250 requests the data block from the source system 210. However, if the signatures match, the target system 250 updates its copy of the reference count of the data block and replicates the data according to the previously received copy. In this manner, according to the examples above, the source system 210 transmits a similarity hash signature of 8 B and a strong hash signature of 20 B for a total of 28 B, compared to the 4 KB that would be incurred by the data block itself. Consequently, this transaction of the replication process requires significantly less bandwidth than one than transfers data blocks.

In some embodiments, the source system 210 determines that a data block was transferred to the target system 250 during a previous replication cycle. In these situations, because the data block is known to be stored on the target system 250, the instruction to replicate solely includes the similarity hash of the data block. In this manner, the storage system can optimize replication by further reducing bandwidth required for the process.

Figure 5A:
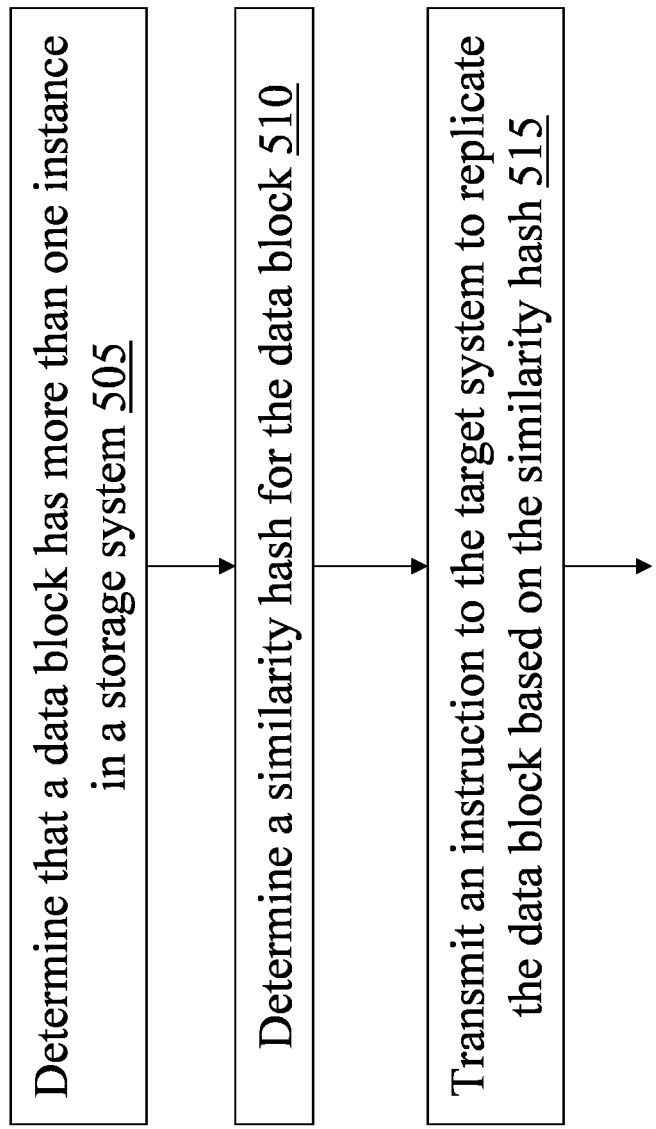
FIGS. 5A-5B are exemplary flow diagrams of a method for replication in a storage system.
Figure 5B:
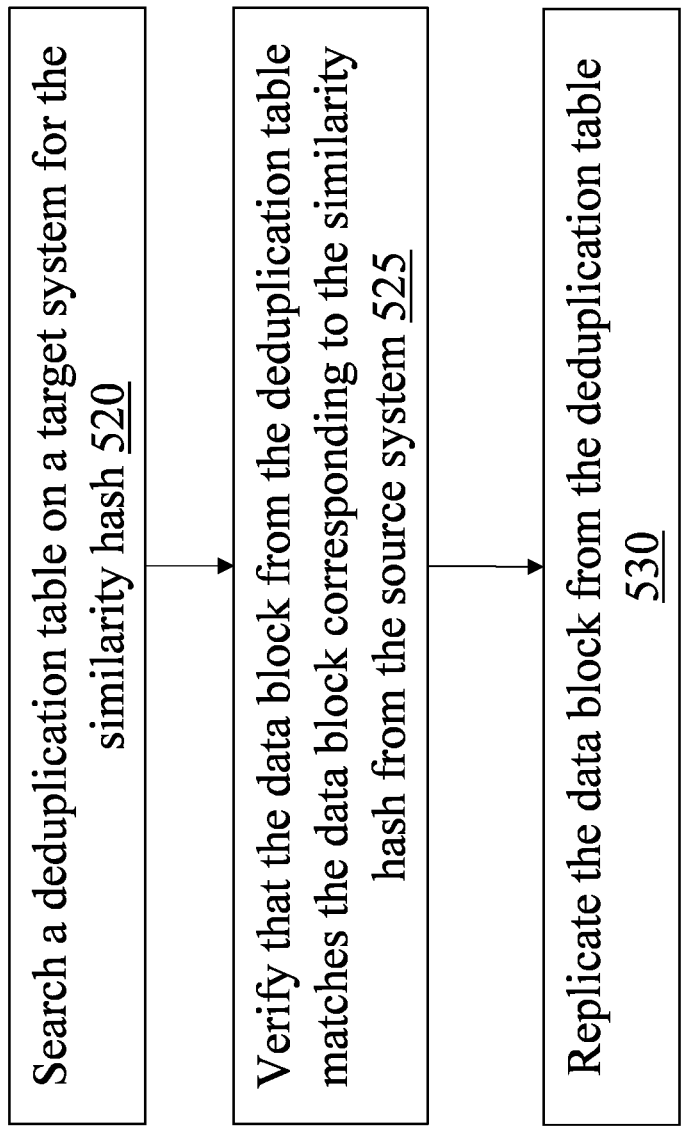

FIGS. 5A-5B are exemplary flow diagrams of a method 500 for replication in a storage system. A source system determines that a data block has more than one instance in a storage system (step 505), and determines a similarity hash for the data block (step 510). The source system transmits an instruction to a target system to replicate the data block based on the similarity hash (step 515). The target system searches a deduplication table for the similarity hash (step 520). The target system verifies that a data block from the deduplication table matches the data block corresponding to the received similarity hash (step 525). The target system replicates the data block from the deduplication table (step 530).

It should again be emphasized that the implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for replication, comprising:
   accessing, by a storage system, a reference count of a data block, wherein the reference count is accessed from metadata of the data block;
   based on the accessing, determining, by the source system, that a data block has more than one instance in a storage system;
   determining a similarity hash for the data block, wherein the similarity hash is based on a non-cryptographic hash function;
   transmitting an instruction to a target system to replicate the data block based on the similarity hash;
   receiving the instruction to replicate the data block based on the similarity hash and a cryptographic hash of the data block;
   searching a deduplication table on the target system for the similarity hash;
   verifying a data block from the deduplication table matches the data block corresponding to the received similarity hash;
   computing a cryptographic hash of the data block from the deduplication table;
   comparing the cryptographic hash of the data block from the deduplication table and the received cryptographic hash from the instruction; and
   replicating the data block from the deduplication table.

2. The method of claim 1, wherein determining that the data block has more than one instance in the storage system comprises:
   determining that a reference count of the data block exceeds one.

3. The method of claim 1, wherein determining that the data block has more than one instance in the storage system comprises:
   accessing metadata of the data block.

4. The method of claim 1, further comprising: determining a cryptographic hash of the data block.

5. The method of claim 4, wherein transmitting the instruction to the target system to replicate the data block comprises:
   transmitting the similarity hash and the cryptographic hash of the data block.

6. The method of claim 1, further comprising: determining the data block has been previously transmitted to the target system.

7. A system for replication in a storage system, the system comprising at least one processor configured to:
   access, by the storage system, a reference count of a data block, wherein the reference count is accessed from metadata of the data block;
   based on the accessing, determine, by the source system, that a data block has more than one instance in a storage system;
   determine a similarity hash for the data block, wherein the similarity hash is based on a non-cryptographic hash function;
   transmit an instruction to a target system to replicate the data block based on the similarity hash;

receive the instruction to replicate the data block based on the similarity hash and a cryptographic hash of the data block;

search a deduplication table on the target system for the similarity hash;

verify a data block from the deduplication table matches the data block corresponding to the received similarity hash;

compute a cryptographic hash of the data block from the deduplication table;

compare the cryptographic hash of the data block from the deduplication table and the received cryptographic hash from the instruction; and replicate the data block from the deduplication table.

8. The system of claim 7, wherein the processor is further configured to: determine that a reference count of the data block exceeds one.

9. The system of claim 7, wherein the processor is further configured to: access metadata of the data block.

10. The system of claim 7, wherein the processor is further configured to: determine a cryptographic hash of the data block.

11. The system of claim 10, wherein the processor is further configured to: transmit the similarity hash and the cryptographic hash of the data block.

12. The system of claim 7, wherein the processor is further configured to: determine the data block has been previously transmitted to the target system.

* * * * *